United States Patent [19]

Oguchi et al.

[11] Patent Number: 5,691,844
[45] Date of Patent: Nov. 25, 1997

[54] REFLECTION MIRROR

[75] Inventors: Tomihiro Oguchi; Hiroyuki Kubozoe; Hiroshi Tamura; Nozomu Kikuchi; Hirokazu Izumi; Tadashi Toriumi; Manabu Akagi; Yoshihide Hamaguchi, all of Tokyo-to, Japan

[73] Assignee: Pioneer Electronic Corporation, Japan

[21] Appl. No.: 399,150

[22] Filed: Mar. 6, 1995

[30] Foreign Application Priority Data

Mar. 9, 1994 [JP] Japan ................... 6-038838

[51] Int. Cl.$^6$ ................. G02B 27/26; G02B 1/10; G02B 5/08

[52] U.S. Cl. ............. 359/465; 359/487; 359/584; 359/585; 359/884

[58] Field of Search ................. 359/465, 487, 359/488, 584, 585, 586, 498, 838, 884

[56] References Cited

U.S. PATENT DOCUMENTS

| | | | |
|---|---|---|---|
| 4,746,202 | 5/1988 | Perilloux et al. | 359/487 |
| 5,267,081 | 11/1993 | Pein | 359/884 |

*Primary Examiner*—Paul M. Dzierzynski
*Assistant Examiner*—Darren E. Schuberg
*Attorney, Agent, or Firm*—Nixon & Vanderhye

[57] ABSTRACT

A reflection mirror of a projection display unit which displays a stereoscopic image through a light polarization glasses, reflects a linearly polarized light emitted from a projection source through a polarizing plate toward a screen. The reflection mirror includes: a glass substrate; a metal film provided on the glass substrate; a first dielectric film provided on the metal film; and a second dielectric film provided on the first dielectric film, wherein each of the first and second dielectric films includes a predetermined thickness and a predetermined refractive index so that a phase difference between a p-polarized light of a reflected light and a s-polarized light of the reflected light is within a range from −45 degree to 45 degree in case of an incident angle of the linearly polarized light being varied from 0 degree to 45 degree.

5 Claims, 7 Drawing Sheets

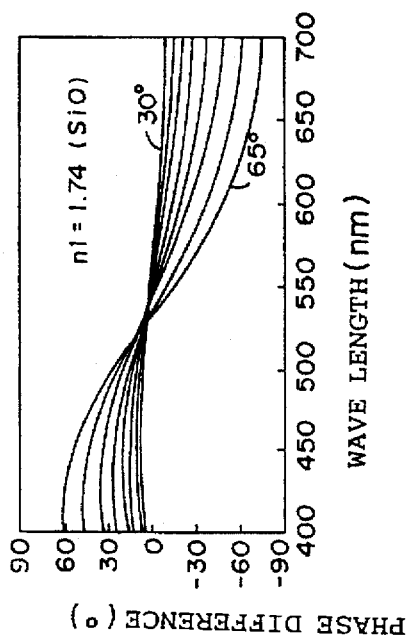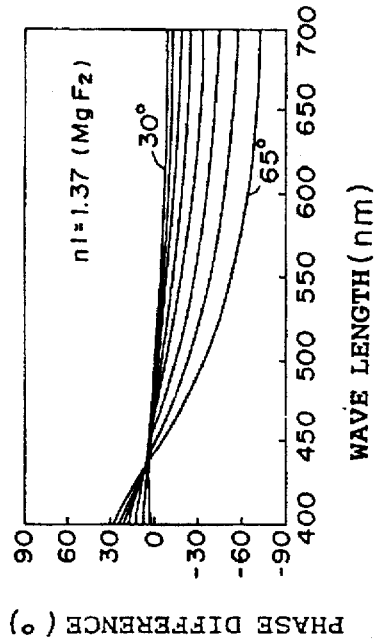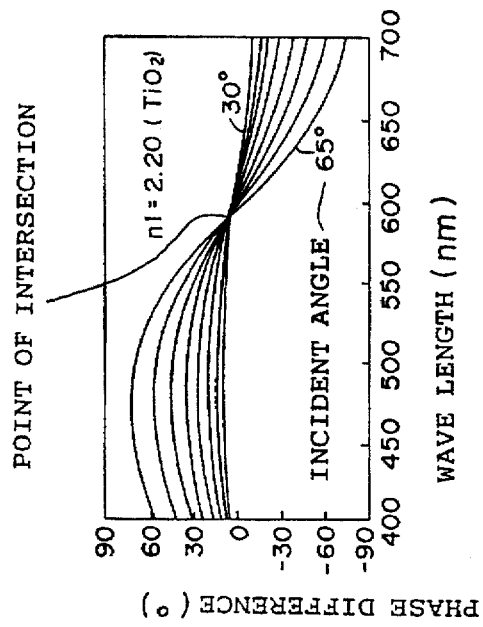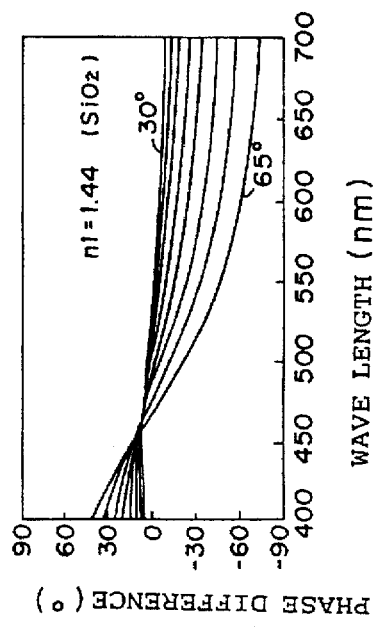

101: LIGHT POLARIZATION GLASS
102: SCREEN
103: PROJECTION SOURCE
104: POLARIZING PLATE

111: LIGHT POLARIZATION GLASS
112: LENTICULE
113: FRESNEL SCREEN
114: REFLECTION MIRROR
115: POLARIZING PLATE
116: PROJECTION SOURCE

REFLECTION MIRROR

BACKGROUND OF THE INVENTION

1. Field of the Invention

The present invention relates to a reflection mirror of a projection display unit which displays a stereoscopic image through a light polarization glasses, for reflecting a light emitted from a projection source toward a screen.

2. Description of the Related Art

There is a projection display unit which uses a binocular parallax and displays a stereoscopic image through a light polarization glasses without using a reflection mirror. FIG. 9 is a schematic diagram showing this kind of projection display unit, in which light emitted from a projection source 103 is projected to a screen 102 through a polarizing plate 104 without using the reflection mirror and the projection source 103 includes six CRTs (Cathode-Ray Tube). Therefore, the depth of the projection display unit is increased, since the distance between the screen 102 and the projection source 103 are predetermined.

In order to decrease the depth of the projection unit, there is a projection display unit which displays a stereoscopic image through a light polarization glasses by using a reflection mirror for reflecting a light emitted from a projection source toward a screen, as shown in FIG. 10. In FIG. 10, a light emitted from the projection source 116 is linearly polarized through the polarizing plate 115 and is reflected toward the Fresnel screen 113 by a reflection mirror 114. Thus, stereoscopic image can be observed through a lenticule 112 and a light polarized glasses 111. According to this arrangement, since the reflection mirror 114 is provided between the projection source 116 and the lenticule 112, the depth of the projection display unit can be decreased.

However, in case of the projection display unit shown in FIG. 10, since reflectivity of the reflection mirror 114 of p-polarized light is different from that of s-polarized light, phase of the p-polarized light of the reflected light is different from that of s-polarized light of the reflected light, and the reflected light is elliptically polarized. Therefore, resolution of the observed stereoscopic image is reduced.

SUMMARY OF THE INVENTION

Accordingly, an object of the present invention is to provide a reflection mirror which can minimize the phase difference between the p-polarized light and s-polarized light, and can enhance the resolution of the stereoscopic image.

According to the present invention, the above mentioned object can be achieved by a reflection mirror of a projection display unit which displays a stereoscopic image through a light polarization glasses, for reflecting a linearly polarized light emitted from a projection source through a polarizing plate toward a screen, said reflection mirror including: a glass substrate; a metal film provided on the glass substrate; a first dielectric film provided on the metal film; and a second dielectric film provided on the first dielectric film, wherein each of the first and second dielectric films includes a predetermined thickness and a predetermined refractive index so that a phase difference between a p-polarized light of a reflected light and a s-polarized light of the reflected light is within a range from −45 degree to 45 degree in case of an incident angle of the linearly polarized light being varied from0 degree to 45 degree.

It is preferred that the metal film includes an Al film, that the first dielectric film includes an SiO film, and that the second dielectric film includes an MgF$_2$ film.

According to another aspect of the present invention, there is provided a reflection mirror of a projection display unit which displays a stereoscopic image through a light polarization glasses, for reflecting a linearly polarized light emitted from a projection source through a polarizing plate toward a screen, said reflection mirror including: a glass substrate; a metal film provided on the glass substrate; a first dielectric film provided on the metal film; and a second dielectric film provided on the first dielectric film, wherein each of the first and second dielectric films is one selected from the group consisting of $Ti_2O_3$, $ZrO_2$, $Y_2O_3$, SiO, $SiO_2$ and $MgF_2$.

The reflection mirror of the present invention includes the first and second dielectric films, each of the first and second dielectric films having a predetermined thickness and a predetermined refractive index so that a phase difference between a p-polarized light of the reflected light and a s-polarized light of the reflected light is within a range from −45 degree to 45 degree in case of an incident angle of the linearly polarized light being varied from 0 degree to 45 degree. Therefore, the stereoscopic vision can be obtained through the light polarization glasses without decreasing a resolution of the observed image.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

In the accompanying drawings:

FIG. 4(a) 4(b), 4(c) and 4(d) is a diagram showing the phase difference between p-polarized light and s-polarized light with respect to wave length, if the incident angle $\theta_0$ of the linearly polarized light is varied from 30 degree to 65 degree;

FIG. 6(a), 6(b), 6(c) and 6(d) is a diagram showing the phase difference between p-polarized light and s-polarized light with respect to wave length, if the incident angle of the linearly polarized light is varied from 30 degree to 65 degree and the refractive index of the second dielectric is a constant value 1.37;

DESCRIPTION OF THE PREFERRED EMBODIMENTS

A preferred embodiment according to the present invention will now be described below with reference to the accompanying drawings.

A reflection mirror of the present invention includes a glass substrate, a metal film provided on the glass substrate, and a coating film provided on the metal film.

First, method of deciding thickness and material of the coating film is described below.
Minimization of phase difference When a linearly polarized light is reflected by a surface of the metal film, phase of p-polarized light is different from phase of s-polarized light. The phase difference $\delta(P-S)$ between the p-polarized light of the reflected light and the s-polarized light thereof is represented as follows:

$$\delta(P-S) = f(n_1, \theta_1, n_2, k)$$

The phase difference $\delta(P-S)$ is a function of $n_1$, $\theta_1$, $n_2$ and $k$. Symbol "$n_1$" represents a refractive index of the coating material, symbol "$\theta_1$" represents an incident angle of the linearly polarized light on the metal film, symbol "$n_2$" represents a refractive index of the metal film, and symbol "$k$" represents a absorption coefficient of light absorbed into the metal film.

As explained before, if there is the phase difference between the p-polarized light of the reflected light and the s-polarized light thereof, the reflected light is elliptically polarized, and, therefore, resolution of the observed image is reduced. Thus, the refractive index and the thickness of the coating material are selected so that the phase difference may be minimized.
Minimization of difference in reflectivity Emission intensities of red light, green light and blue light respectively have their respective peak at 633 nm, 533 nm (or 537.8 nm) and 441.6 nm. According to the present invention, in order to keep linearly polarized light, the metal film is coated so that the phase difference and the reflectivity difference at 633 nm, 533 nm (or 537.8 nm) and 441.6 nm may be minimized.

Figure 1A:
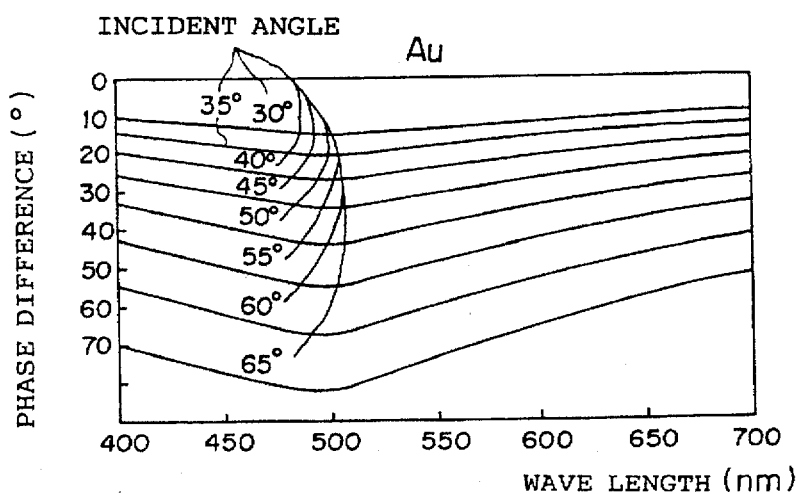
FIG. 1(a) 1(b) and 1(c) is a diagram showing phase difference between p-polarized light and s-polarized light with respect to wave length, if incident angle of linearly polarized light is varied from 35 degree to 65 degree.
Figure 1B:
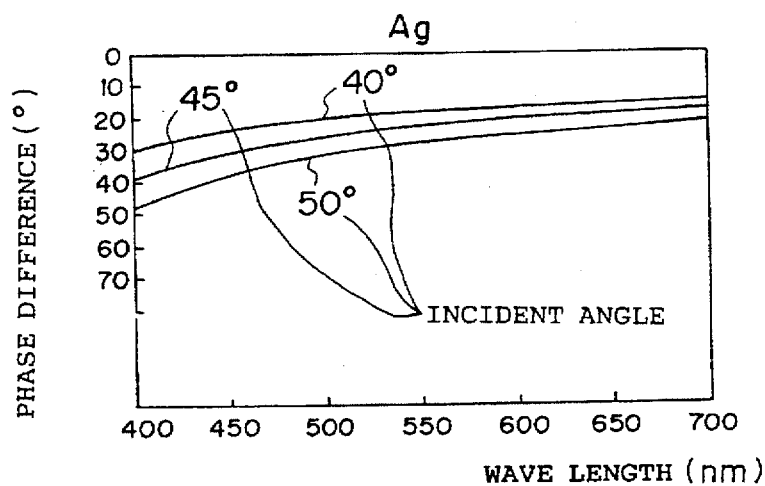
Figure 1C:
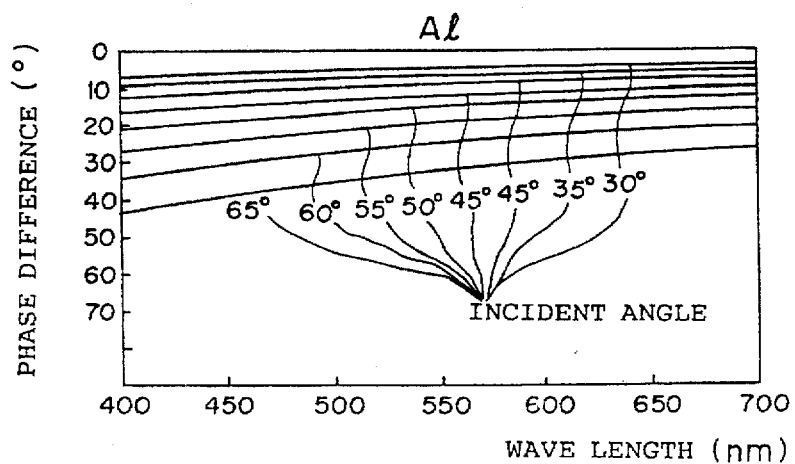

As explained before, if there is the phase difference between the p-polarized light of the reflected light and the s-polarized light thereof, the reflected light is elliptically polarized, and, therefore, the resolution of the observed image is reduced. Thus, in order to minimize the phase difference, the refractive index and the thickness of the coating material are selected so that the reflectivity difference may be minimized.
Construction of reflection mirror
(1) Selection of metal film provided on glass substrate FIG. 1 is a diagram showing the phase difference between the p-polarized light and the s-polarized light with respect to wave length. FIG. 1(a) shows the phase difference if Au is used as the metal film and the incident angle of the linearly polarized light is varied from 30 degree to 65 degree, FIG. 1(b) shows the phase difference if Ag is used as the metal film and the incident angle of the linearly polarized light is varied from 40 degree to 50 degree, and FIG. 1(c) shows the phase difference if Al is used as the metal film and the incident angle of the linearly polarized light is varied from 30 degree to 65 degree.

Variation of the phase difference between the p-polarized light and the s-polarized light depends on the refractive index of the metal film and the absorption coefficient of the metal film. Since the refractive index of the metal film and the absorption coefficient thereof are inherent in respective metal film, the phase differences with respect to the wave length are respectively different, as shown in FIG. 1(a),(b) and (c). As explained before, it is preferable that the phase difference between the p-polarized light of the reflected light and the s-polarized light thereof is minimized in order to prevent decrease of the resolution of the observed image. As is clearly understood from FIG. 1, if Ag or Al is used as the metal film, the phase difference between the p-polarized light and the s-polarized light is minimized. It is proved from experiment that Al is most preferably used as the metal film.

Figure 2:
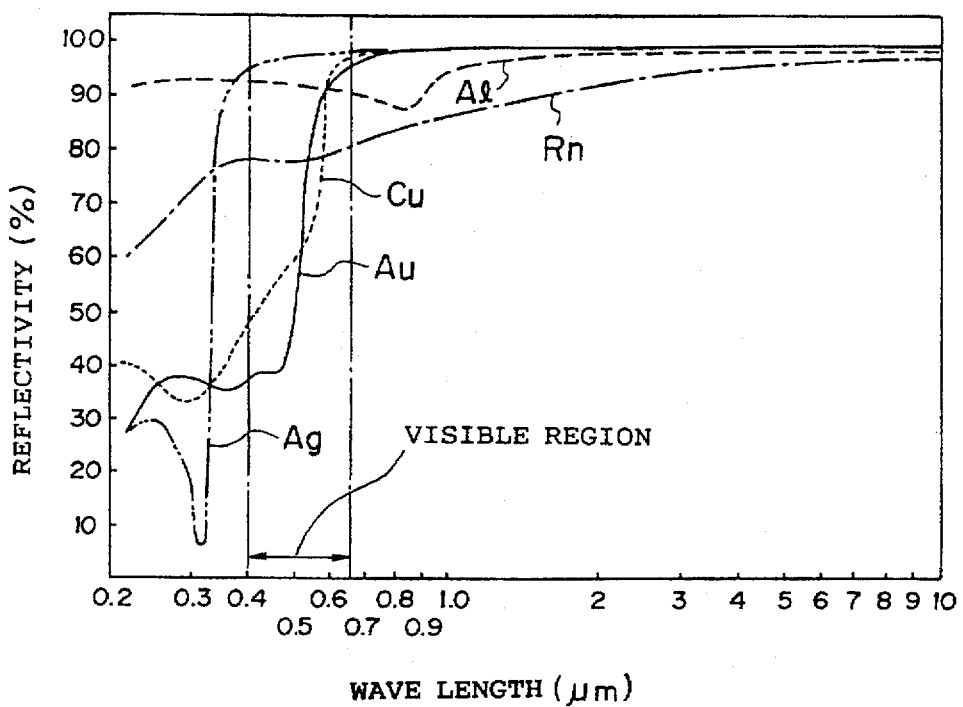
FIG. 2 is a diagram showing variation of reflectivity with respect to wave length if Ag, Au, Cu, Al or Rn is used as a metal film.

FIG. 2 shows a diagram showing variation of reflectivity with respect to wave length if Ag, Au, Cu, Al or Rn is used as the metal film.

As explained before, in order to keep the linearly polarized light, it is preferable that difference between reflectivity of the p-polarized light and that of the s-polarized light is minimized. As shown in FIG. 2, variation of the reflectivity with respect to wave length within visible region is minimized, if Ag, Al or Rn is used as the metal film. However, since the metal film having high reflectivity is preferable if the metal film is used for the reflection mirror, Ag or Al, which has high reflectivity, is preferably used as the metal film.

It is proved from FIGS. 1 and 2 that Ag or Al is preferable as the metal film. However, since phase property of Al is better than that of Ag and Al is more suitable for coating than Ag, in this embodiment, Al is used as the metal film.
(2) Formation of dielectric film Dielectric film is provided on the Al film. The material of the dielectric film is selected to choose the refractive index of the dielectric film, and the thickness of the dielectric film is selected so that the phase difference between the p-polarized light and the s-polarized light may be minimized with respect to wide incident angle of the linearly polarized light.

In order to minimize the phase difference with respect to wave length $\lambda_0$, the refractive index of the dielectric film is selected so that the difference in optical path caused by variation of incident angle $\theta_0$ may be canceled. Thus, the phase difference between the p-polarized light and the s-polarized light may be minimized even if the incident angle $\theta_0$ is varied.

i) If one dielectric film is provided on the metal film as coating film

Figure 3:
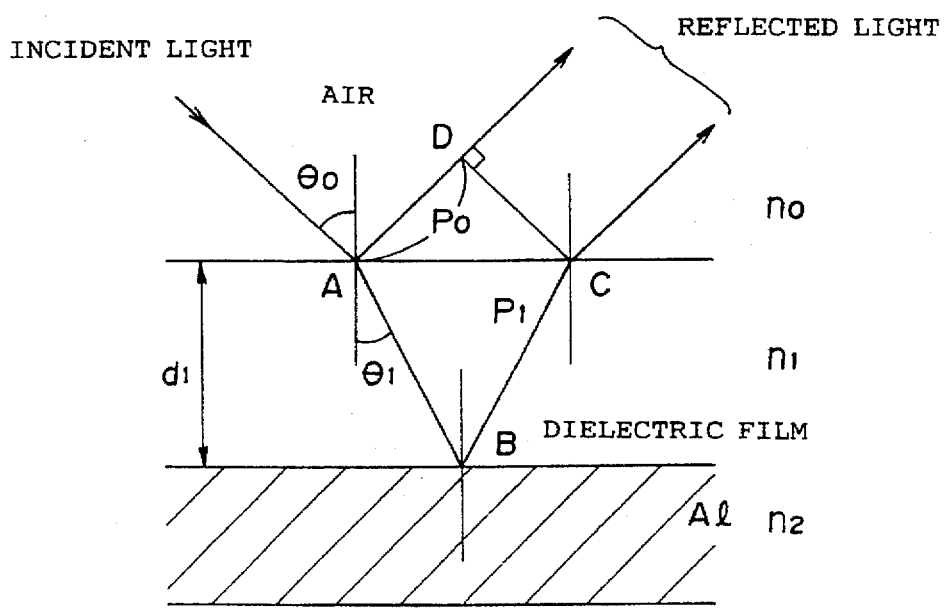
FIG. 3 is a sectional view of a reflection mirror including an Al film and a dielectric film.

FIG. 3 shows a sectional view of the reflection mirror including an Al film and a dielectric film.

Here, optical path difference $(P_0-P_1)$ between reflected light being reflected on a boundary surface between air (refractive index: $n_0$) and the dielectric film (refractive index: $n_1$), and reflected light being reflected on a boundary surface between the dielectric film and the metal film (refractive index: $n_2$) is calculated. As is shown in FIG. 3, $$P_0 = AD$$
$$= 2d_1 \cdot n_0 \cdot \sin\theta_1 \cdot \sin\theta_0/\cos\theta_1$$
$$P_1 = AB + BC$$
$$= 2 \cdot d_1 \cdot n_1/\cos\theta_1$$

Here, "$\theta_0$" represents an incident angle of the linearly polarized light, "$\theta_1$" represents an angle of refraction, and "$d_1$" represents thickness of the dielectric film. Therefore, the optical path difference $(P_0-P_1)$ is calculated as follows:

$$P_0-P_1=2\cdot d_1\cdot n_1(1-(n_0\cdot\sin\theta_0/n_1)^2)^{1/2}$$

Wherein, by way of example, provided if optical path length of the dielectric film is $\lambda_0/4$, $$d1\cdot n_1=\lambda_0/4.$$

Here, $\lambda_0$ is wave length of the light.
Therefore,

[Optical Path Difference] $= P_0 - P_1$
$= \lambda_0/2 \cdot (1-(n_0\cdot\sin\theta_0/n_1)^2)^{1/2}$ If the incident angle $\theta_0$ is a right angle, $\sin\theta_0$ is equal to zero. Therefore,

[Optical Path Difference]$=\lambda_0/2$

FIG. 4 is a diagram showing the phase difference between the p-polarized light and the s-polarized light with respect to wave length, if the incident angle $\theta_0$ is varied from 30 degree to 65 degree and the optical path length of the dielectric film is a constant value $\lambda_0/4$. Wherein, FIG. 4(a) shows the phase difference if the refractive index of the dielectric film $n_1$ is equal to 2.20, FIG. 4(b) shows the phase difference if the refractive index of the dielectric film $n_1$ is equal to 1.74, FIG. 4(c) shows the phase difference if the refractive index of the dielectric film $n_1$ is equal to 1.44, and FIG. 4(d) shows the phase difference if the refractive index of the dielectric film $n_1$ is equal to 1.37.

It is proved from FIG. 4 that the variation of the phase difference adjacent to a point of intersection in case of the incident angle $\theta_0$ being varied from 30 degree to 65 degree becomes small, as the refractive index of the dielectric film $n_1$ becomes small. Here, the point of intersection represents a point, at which each curve intersects each other, as shown in FIG. 4(a)–(d). Therefore, in order to minimize the variation of the phase difference with respect to the wave length $\lambda_0$, thickness of the dielectric film having the smallest refractive index is preferably selected so that the wave length $\lambda_0$ may correspond to the point of intersection. Thus, the phase difference between the p-polarized light and the s-polarized light can be minimized with respect to wide incident angle of the linearly polarized light.

ii) If two dielectric films are provided on the metal as coating film

A further dielectric film, hereinafter referred to as "second dielectric film", is provided on the aforementioned dielectric film, hereinafter referred to as "first dielectric film", so that the phase difference can be also minimized with respect to wave length $\lambda_1$ being different from $\lambda_0$.

FIG. 5 is a diagram showing the phase difference between p-polarized light and s-polarized light with respect to wave length, if two dielectric films are provided on the metal film. Wherein, FIG. 5(a) shows the phase difference if the refractive index of the first dielectric film is equal to 1.74 and the refractive index of the second dielectric film is equal to 2.20, FIG. 5(b) shows the phase difference if the refractive index of the first dielectric film is equal to 1.74 and the refractive index of the second dielectric film is equal to 1.44, FIG. 5(c) shows the phase difference if the refractive index of the first dielectric film is equal to 1.44 and the refractive index of the second dielectric film is equal to 1.37, and FIG. 5(d) shows the phase difference if the refractive index of the first dielectric film is equal to 1.74 and the refractive index of the second dielectric film is equal to 1.37.

Figure 5B:
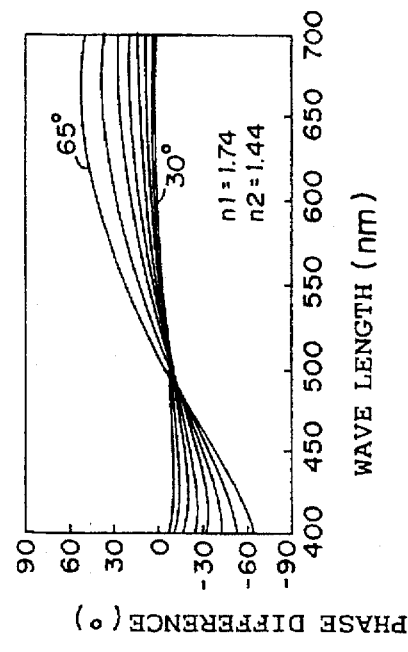
FIG. 5(a), 5(b), 5(c) and 5(d) is a diagram showing the phase difference between p-polarized light and s-polarized light with respect to wave length, if two dielectric films are provided on the metal film.
Figure 5D:
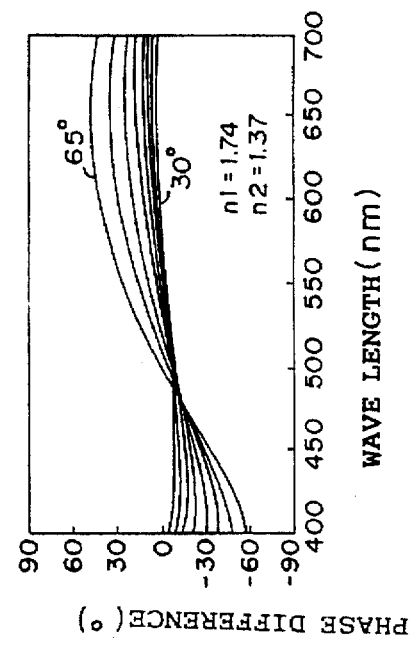
Figure 5A:
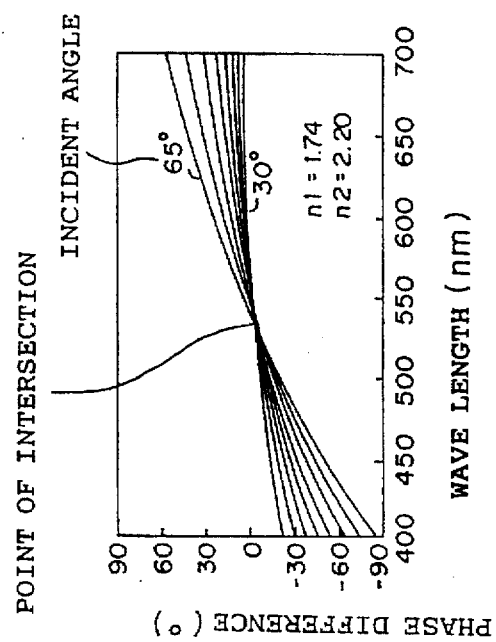

In FIG. 5(a), (b) and (d), each of the refractive indexes of the first dielectric films is a constant value 1.74. The refractive index of the second dielectric of FIG. 5(b) is less than that of FIG. 5(a), and the refractive index of the second dielectric of FIG. 5(d) is less than that of FIG. 5(b). It is proved from FIG. 5(a), (b) and (d), as the refractive index of the second dielectric becomes small in case of that of the first dielectric being constant, the variation of the phase difference adjacent to a point of intersection becomes small in case of the incident angle $\theta_0$ being varied from 30 degree to 65 degree.

Figure 5C:
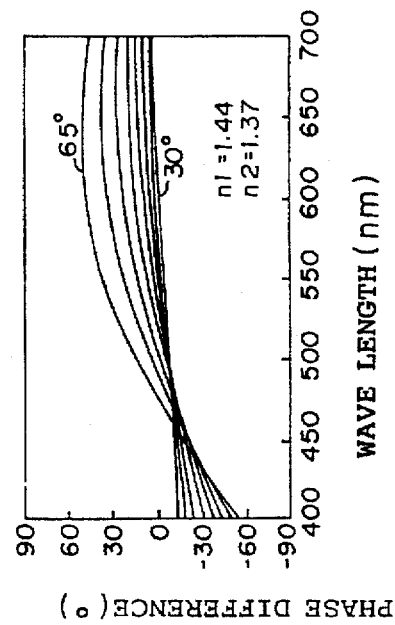

Next, FIG. 5(c) is compared with FIG. 5(d). In FIG. 5(c) and (d), the refractive index of the second dielectric is a constant value 1.37, the refractive index of the first dielectric of FIG. 5(c) is 1.44 and that of FIG. 5(d) is 1.74. It is proved from FIG. 5(c) and (d), as the refractive index of the first dielectric becomes great in case of that of the second dielectric being constant, the variation of the phase difference adjacent to a point of intersection becomes small in case of the incident angle $\theta_0$ being varied from 30 degree to 65 degree.

According to FIG. 5, it is proved that the variation of the phase difference adjacent to the point of intersection in case of the incident angle $\theta_0$ being varied is minimized if the refractive index of the second dielectric $n_2$ is less than that of the first dielectric $n_1$. Therefore, in order to minimize the phase difference with respect to wave length $\lambda_1$, thickness of the second dielectric film having the smaller refractive index than that of the first dielectric film is preferably selected so that the wave length $\lambda_1$ may be equal to the point of intersection. Thus, the phase difference between the p-polarized light and the s-polarized light can be minimized with respect to wider incident angle of the linearly polarized light.

iii) Positioning of the point of intersection

As aforementioned, in order to keep linearly polarized light, the metal film is coated so that the phase difference and the reflectivity difference at 633 nm, 533 nm (or 537.8 nm) and 441.6 nm may be minimized, since emission intensities of red light, green light and blue light respectively have their respective peak at 633 nm, 533 nm (or 537.8 nm) and 441.6 nm.

Figure 6A:
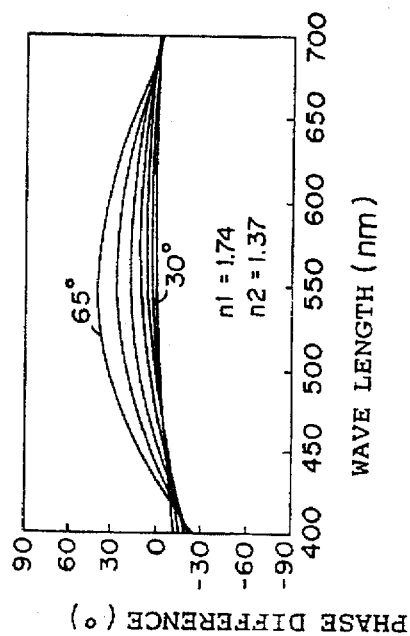
Figure 6B:
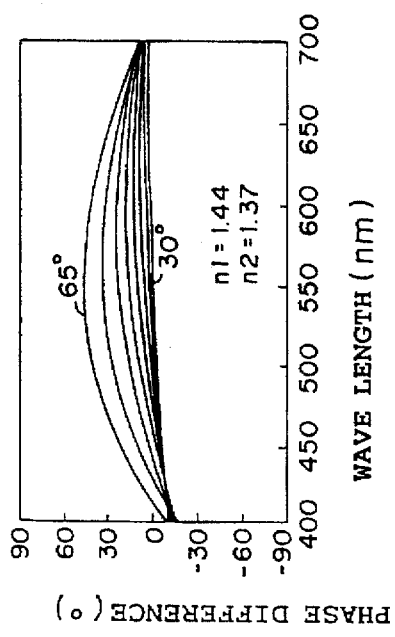
Figure 6C:
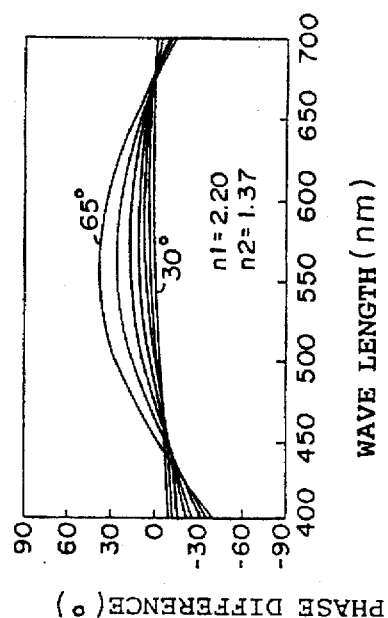

FIG. 6 is a diagram showing the phase difference between the p-polarized light and the s-polarized light with respect to wave length, if the incident angle of the linearly polarized light is varied from 30 degree to 65 degree and the refractive index of the second dielectric is a constant value 1.37. FIG. 6(a) shows the phase difference if the refractive index of the first dielectric film is equal to 1.44, FIG. 6(b) shows the phase difference if the refractive index of the first dielectric film is equal to 1.74 and FIG. 6(c) shows the phase difference if the refractive index of the first dielectric film is equal to 2.20.

It is proved from FIG. 6 that the variation of the phase difference between each of the points of intersections with respect to the incident angle $\theta_0$ being varied is minimized in case of FIG. 6(c). Therefore, in order to minimize the variation of the phase difference, it is preferable that the refractive index of the first dielectric is greater than that of the second dielectric and that difference in the refractive indexes between the first and second dielectrics increased.

If more than two dielectric films are provided on the metal film, the phase difference between the p-polarized light and the s-polarized light can be minimized. However, it is not preferable to construct the reflection mirror by using the more than two dielectric films, since the cost for construction is increased and high performance can not be obtained in spite of the cost being increased. The variation of the phase difference between each of the points of intersections in case of the more than two dielectric films being provided on the metal film, is greater than that of two dielectric films being provided on the metal film. Therefore, it is most preferable that the two dielectric films are provided on the metal film.

It is preferable that the incident angle of the linearly polarized light is within the range from 0 degree to 65 degree, since the size of the projection display unit is too big if the incident angle of the linearly polarized light is greater than 65 degree. It is preferable that the phase difference between the p-polarized light and the s-polarized light is greater than −45 degree and less than 45 degree, since the resolution of the observed image is reduced and the stereoscopic vision can not be obtained through the light polarization glasses in case of the phase difference being beyond the range.

The same effect of the reflection mirror according to the present invention can be obtained if a liquid crystal projector is used as a projection source.

(3) Conclusion

Figure 7:
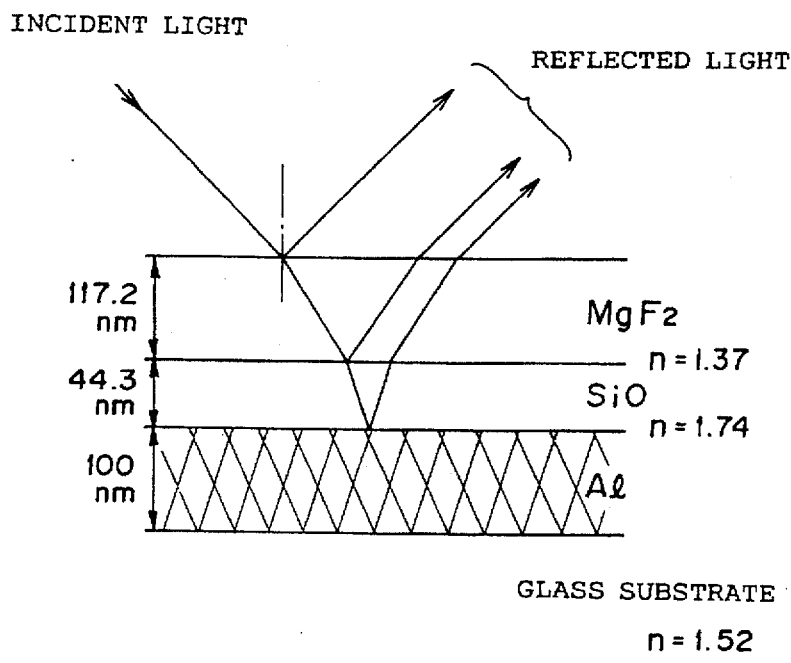
FIG. 7 is a sectional view of a reflection mirror of the present invention.

FIG. 7 is a sectional view of a reflection mirror of the present invention.

Firstly, as explained in the section (1), Al is used as the metal film. Secondly, as explained in the section (2), two dielectric films are used to coat the metal film. By way of example, the refractive index of the first dielectric film is 1.74 and the refractive index of the second dielectric film is 1.37.

$Ti_2O_3$, $ZrO_2$ (the refractive index: 2.05), $Y_2O_3$ (the refractive index: 1.87), SiO (the refractive index: 1.90), $SiO_2$ (the refractive index: 1.46) and $MgF_2$ (the refractive index: 1.37) are used as the materials of the first and second dielectric films. The materials are selected so that the refractive index of the first dielectric film may be greater than that of the second dielectric index. Each of dielectric films is composed of one of the materials or a mixture consisting of more than one of the materials so that the refractive indexes of the first and second dielectrics and the thickness thereof may be preferably selected. The materials are selected with considering adhesive strength between the material of the dielectric film and the metal film, absorbency of the material of the dielectric film, and strength of the material thereof. Each of refractive indexes of the materials shown before is one example, and is respectively different each other because of difference of bulk density, which is caused by air being mixed with the dielectric material at the time of coating.

Finally, the thickness of each of the dielectric films and the refractive indexes thereof are selected so that the phase difference between the p-polarized light and the s-polarized light may be minimized with respect to the wave lengths 633 nm, 533 nm (or 537.8 nm), and 441.6 nm, at which emission intensities of red, green and blue emitted from CRT respectively have their respective peak. Namely, it is preferable that each wave length of the above points of intersections respectively corresponds to the wave lengths 633 nm, 533 nm (or 537.8 nm), and 441.6 nm. FIG. 7 shows one example of the reflection mirror of the present invention, which satisfies the above requirements.

According to the construction of the present invention, the phase difference between the p-polarized light and the s-polarized light can be minimized in case of the incident angle of the linearly polarized light being varied from 0 degree to 65 degree. Therefore, the stereoscopic vision can be obtained through the light polarization glass without decreasing the resolution of the observed image, if the depth of the projection display unit is decreased by the reflection of the light on the reflection mirror of the present invention.

Figure 8:
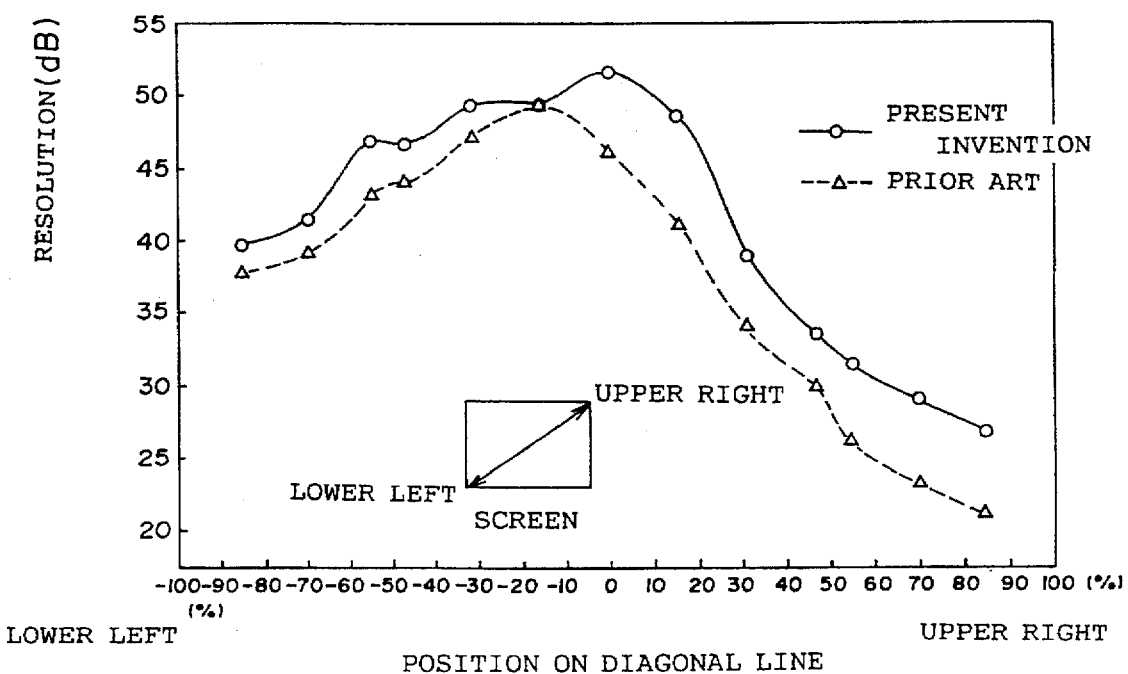
FIG. 8 is a diagram showing the resolution of a reflection mirror of prior art and that of the reflection mirror of the present invention.
Figure 9:
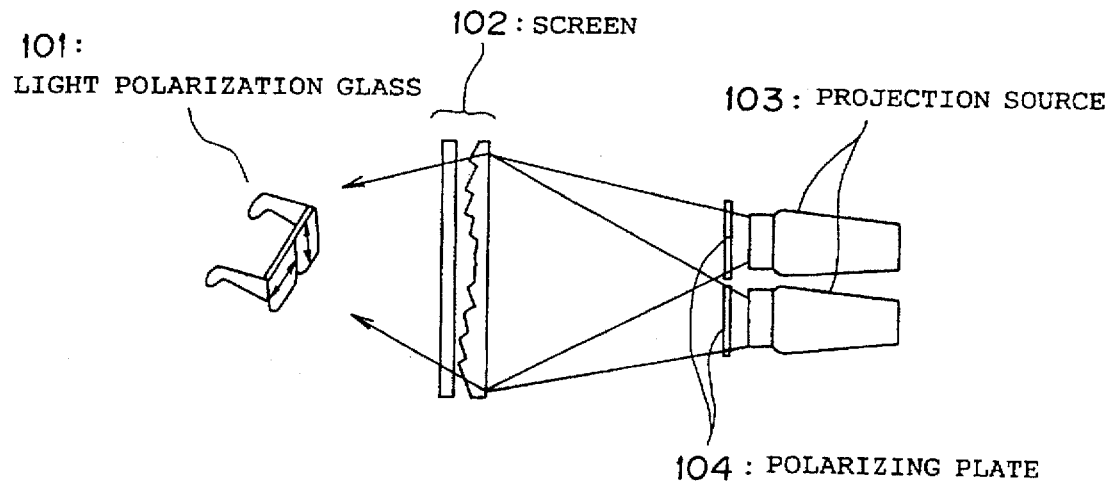
FIG. 9 is a schematic diagram showing a projection display unit, in which light emitted from the projection source is projected to the screen through a polarizing plate without using a reflection mirror and the projection source includes six CRTs (Cathode-Ray Tube)
Figure 10:
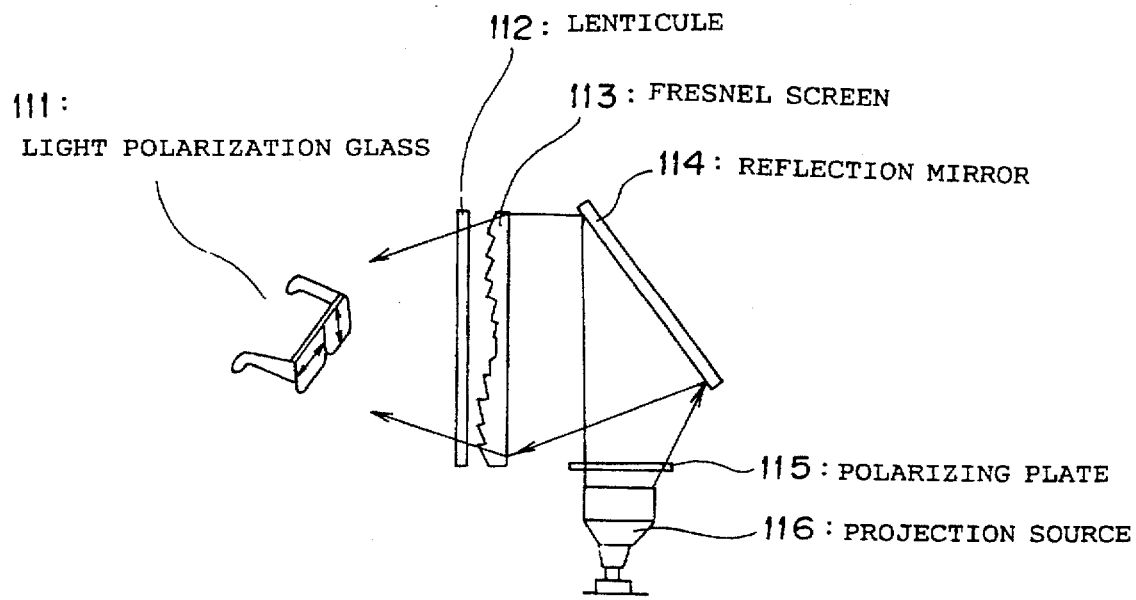
FIG. 10 is a schematic diagram showing a projection display unit which displays a stereoscopic image through a light polarization glasses by using a reflection mirror for reflecting a light emitted from a projection source toward a screen.

FIG. 8 is a diagram showing the resolution of the reflection mirror of the prior art and that of the reflection mirror of the present invention. In the FIG. 8, the horizontal axis is the position on a diagonal line of a screen, wherein the position 0 (%) corresponds to the center of the screen, the position −100 (%) corresponds to the lower left of the screen and the position 100 (%) corresponds to the upper right of the screen. The vertical axis of FIG. 8 indicates the resolution (dB). The resolution of the prior reflection mirror is reduced at the upper right of the screen, since the incident angle of the linearly polarized light is increased. However, as shown in FIG. 8, the resolution of the reflection mirror of the present invention can be improved in comparison with that of the prior art in case of the position being from 0 (%) to 100 (%), i.e. at the upper right of the screen.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A reflection mirror of a projection display unit which displays a stereoscopic image through light polarization glasses, for reflecting a linearly polarized light emitted from a projection source through a polarizing plate toward a screen, said reflection mirror comprising:

a glass substrate;

a metal film provided on the glass substrate;

a first dielectric film provided on the metal film; and a second dielectric film provided on the first dielectric film, wherein each of the first and second dielectric films includes a predetermined thickness, the first dielectric film has a first refractive index and the second dielectric film has a second refractive index smaller than the first refractive index so that a phase difference between a p-polarized light of a reflected light and a s-polarized light of the reflected light is within a range from −45 degrees to 45 degrees in case of an incident angle of the linearly polarized light being varied from 0 degrees to 45 degrees.

2. A reflection mirror as claimed in claim 1, wherein the metal film comprises an Al film.

3. A reflection mirror as claimed in claim 2, wherein the first dielectric film comprises an SiO film.

4. A reflection mirror as claimed in claim 3, wherein the second dielectric film comprises an $MgF_2$ film.

5. A reflection mirror of a projection display unit as claimed in claim 1 wherein each of the first and second dielectric films is selected from the group consisting of $Ti_2O_3$, $ZrO_2$, $Y_2O_3$, SiO, $SiO_2$ and $MgF_2$.

* * * * *